Aug. 15, 1967  F. KRICKLER  3,336,089
PRESSURE LUBRICATION MEANS FOR CRAWLER TRACTOR CHAIN
Filed May 4, 1966  2 Sheets-Sheet 1

INVENTOR
FRANK KRICKLER
BY James R. Forman
ATTORNEY

Aug. 15, 1967    F. KRICKLER    3,336,089
PRESSURE LUBRICATION MEANS FOR CRAWLER TRACTOR CHAIN
Filed May 4, 1966    2 Sheets-Sheet 2
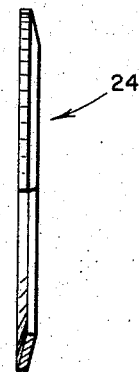
FIG. 3
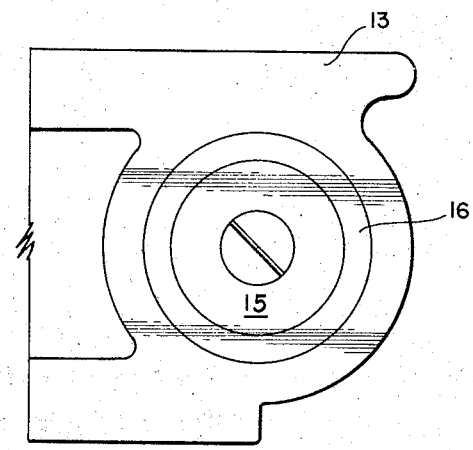
FIG. 4
FIG. 5
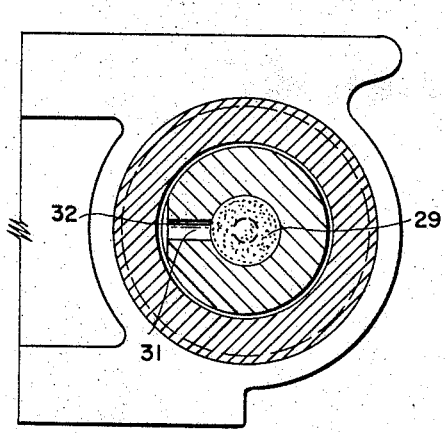
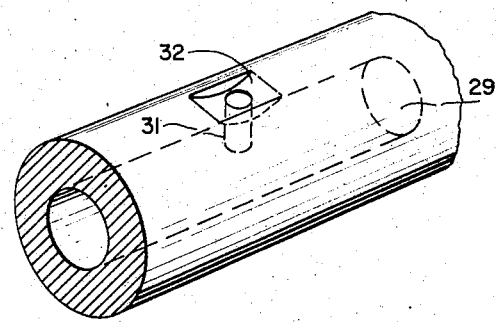
FIG. 6
INVENTOR
FRANK KRICKLER
BY James R. Forman
ATTORNEY

United States Patent Office 3,336,089
Patented Aug. 15, 1967

3,336,089
PRESSURE LUBRICATION MEANS FOR
CRAWLER TRACTOR CHAIN
Frank Krickler, Lake Worth, Fla., assignor, by direct and mesne assignments, to Pressurized Track Pins, Inc., Indian Harbour Beach, Fla.
Filed May 4, 1966, Ser. No. 547,401
6 Claims. (Cl. 305—11)

This invention relates to chain link assemblies for crawler tractors, and more particularly to a chain link assembly having pressure-lubricated pins and bushings with seals under pressure of a lubricant to effect a positive seal against entry of abrasives between the pins and bushings and link connections.

Track laying vehicles with chains or tracks of the nature to which this invention pertains include articulated links joined by pins and bushings. The link pins and bushings move in relation to one another through an arc as a track is driven in an endless path. The bushings are engaged by the teeth of a drive sprocket and are guided by an idler sprocket and rollers. Slack in a track or chain is prohibitive beyond a predetermined tolerance because of the wear induced on the sprocket teeth when the bushings fail to engage the teeth properly. Lengthening of the chain is caused principally by wear of the pins and bushings, and the wear of such parts results from the entrance of abrasive grit, sand, and dirt between these relatively movable elements. The wear is aggravated by the heat of friction or grinding of these parts together. A major concern of the industry is the lubricating of the pins and bushings while maintaining effective seals against attack of foreign materials between the parts. Heretofore it has been the customary practice to wipe grease on a pin prior to its assembly into a chain, or not to lubricate the pin at all. After assembly, in either event, attempts to grease the pins by various means have been unsatisfactory. Accordingly track failure is frequent because of locked pins and bushings through heat and of track lengthening through wear of the pins and bushings with resultant sprocket teeth wear. Track failure is a highly costly factor both from tractor down-time and repair.

It is a primary object of the present invention to provide a link pin assembly having a pin lubricated by grease maintained under pressure.

Another object is the provision of a lubricated track pin having lubricant stored in the pin and dispensed under pressure to the pin surface over an extended period of time.

A further object of the invention is to provide seals to prevent entry of harmful foreign material between movable parts of a pin assembly with the seals being forced into sealing relationship with associated elements by lubricant pressure.

Still another object is the provision of a chain link assembly having a pressure lubricated pin and bushing with the lubricant maintained under pressure over extended periods of time to prevent entry of abrasives between relatively movable chain elements.

A still further object is the provision of a chain link assembly which is self-lubricating.

Other objects and many attendant advantages of the present invention will become more readily apparent from the following description of a preferred embodiment thereof when read in conjunction with the appended drawings, wherein:

FIG. 3 is an elevational view, partly in section, of a preferred cup washer;

FIG. 4 shows the end section of the pin-and-bushing connection taken along line IV—IV of FIG. 1;

FIG. 5 is a cross-section of the pin and bushing taken along line V—V of FIG. 1; and FIG. 6 depicts in perspective view a portion of the pin with the lubricant conduits exposed.

Figure 1:
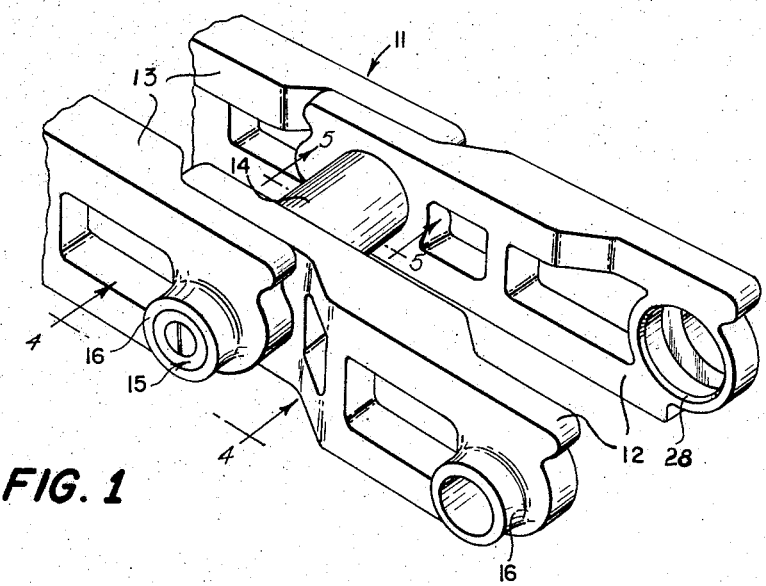
FIG. 1 is a perspective view of two sets of links joined together by a pin-and-bushing connection.

Referring to the drawings, where like reference characters designate like or corresponding parts throughout the views, there is shown in FIG. 1 a chain link assembly designated generally by numeral 11. The assembly is comprised of two sets of links, 12 and 13, respectively, joined by an annular bushing 14 and a pin 15. The sets of links are each offset such that one set 12 is fixed by force-fitting, for example, to the bushing 14 and the other set 13 is secured, as by force-fitting, to the pin 15 which is received for relative arcuate movement within the bushing. The construction thus far described is conventional.

Figure 2:
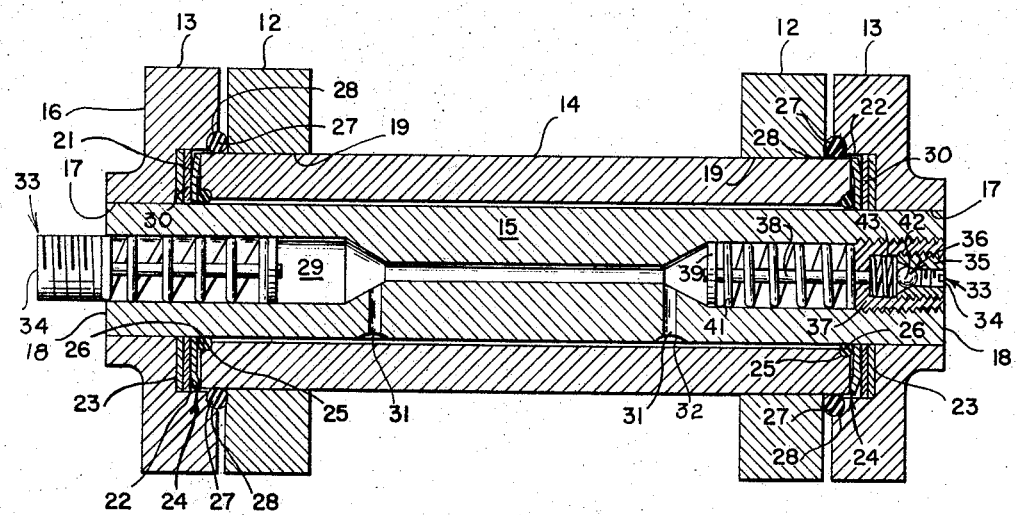
FIG. 2 is a longitudinal cross-section of the pin-and-bushing connection of FIG. 1.

As best shown in FIGS. 1, 2 and 4, bosses 16 are provided at matching ends of the respective links 12 and 13, and the bosses are coaxial with the apertures 17 of links 13 into which are secured the ends of the link pin 14 with the pin ends 18 flush with the outer surfaces of the bosses 16. Apertures 19 of links 12 receive the spaced end portions of the bushing 14 and the links 12 are secured to the bushing 14 as by force fitting. The ends 21 of the bushing 14 extend outwardly into a counterbore or annular recess 22 formed in the links 13.

For clarity of description the arrangement of seals will now be explained with reference to the right-hand side of the assembly as viewed in FIG. 2, it being understood that the arrangement of seals on the left-hand side of the assembly is similar. Starting from the outboard of the assembly toward the center, a friction plate 23 is located in the recess 22 of link 13 to cover the recess end face and to surround the pin 15. Next, an apertured wear disk 30 is positioned adjacent plate 23 in intimate face-to-face contact therewith. A thrust washer 24 is stationed adjacent disk 30 with its inner face in driven contact with the end of the bushing 14 and in urging contact with a seal 26 partially within a seat 25. The washer 24 preferably is cup-shaped as depicted in FIG. 3, such that the concavity directs forces against the seal 26 in a direction to urge the seal into firm sealing contact with the pin 14. It may be appreciated that the friction plate 23 and the wear disk 30 may be either bonded, or separate as shown.

By the seal arrangement described, the arcuate movement of the pin and bushing during travel of the track, for example, causes link 13, the pin 15, friction plate 23, and the wear disk 30 to move as a unit. Similarly, the link 12, bushing 14, seal 26, and thrust washer 24 are driven as a unit. Accordingly, contact of the relatively movable units takes place between the wear disk 30 and the washer 24. Since each of these latter parts are composed of wear resistant material such as steel, and each of their confronting faces are relatively smooth, pin and bushing wear is not encountered.

In adapting used and worn assemblies for the construction described herein, it has been found best to provide the recess 22 of link 13 with a counterbore or annular seat 28 into which is placed an O-ring 27 of material such as brass or bronze which will wear to conform to the surface of the bushing 14. Thus, surface wear of the bushing at its portion extending into the recess 22 of link 13, which took place in its prior use, is compensated for the O-ring 27. New links, pins, and bushings when assembled in light of the teachings of this invention do not require the O-ring, but it may be provided if specified.

Referring now to the lubricating system of the invention, there is shown in FIG. 2 a reservoir 29 drilled in the pin 15 which extends throughout the axial length thereof, for example. Radial passages 31, which open into surface grooves or slots 32, communicate the pin surface with the reservoir. The pin 15 is received slidably within the bushing 14, and the interface of the outer pin surface and the bushing inner surface is of a cross-section which will permit a lubricant to be forced from the reservoir, through passages 31, and along such interface. The reservoir 29 is formed with enlarged end portions joined by an axial passage. Lubricant is forced under pressure into the reservoir 29 from the outboard or right-hand side of the pin, FIG. 2, into passages 31, and then into the area between the pin and bushing surfaces.

A fitting generally designated by numeral 33 is threadedly received into the tapped end of the axial bore or reservoir 29 at the outboard side of the pin 15. A plug 34 is threadedly engaged, for example, with an axial bore of a sleeve 35. The bore of the sleeve is enlarged to form a seat for a valve 36. A cup-shaped member 37 threadedly receives the sleeve 35 into its open end, and the member 37 has fixed to its base an axially extending tube 38 which communicates the valve 36 with the reservoir 29. A follower 39 is slidably positioned on the axial tube 38 to bear against the lubricant admitted through tube 38 beyond the inner face of the follower. A spring 41 urges the follower 39 toward the center of the reservoir. To avoid the follower from passing the end of the tube 38 on which it slides, the tube end may be flared or disrupted slightly, or the spring 41 may be fixed by suitable means to the base of the cup member 37 and the follower 39.

The valve 36 includes a sphere 42 which is normally forced into sealing engagement with the surface of the enlarged bore of the sleeve 35 by means of a spring 43 positioned within the recess of cup member 37.

The inboard side, or left-hand side of the assembly viewed in FIG. 2, has an enlarged bore which together with the enlarged bore at the right-hand side of the pin and a connecting axial passage, forms the pin reservoir 29. A fitting 33 on the inboard end of the pin 15 varies slightly in construction with respect to the fitting 33 at the opposite end of pin 15 in that a plug 34 is all that is necessary. The valve 36 and associated elements are omitted because the lubricant need be introduced into the reservoir 29 only from the outboard end of the pin and tractor chain. Accordingly, an air bleed is provided simply by omitting the valve 36 from the fitting 33 on the inboard end of the pin 15.

The lubricant, admitted through fitting 33 at the outboard end of the pin 15, is forced into the reservoir 29 under pressure of a grease gun or pump, for example, and the air within the pin reservoir 29 at an initial filling is bled through the opened end of the fitting 33 at the inboard end of the pin 15. The left-hand fitting 33 is shown withdrawn from its position of use in FIG. 2, but in practice only the plug 34 is removed from this fitting to allow air to flow in advance to the lubricant as it is pumped into the reservoir. As soon as the lubricant flows through the lef-hand fitting 33, the plug 34 is threaded into the fitting to block further flow of lubricant therethrough. At this time the reservoir 29, the passages 31, the slots 32, and the area between the confronting surfaces of the bushing 14 and the pin 15 continue to fill with lubricant as it is pumped through the valve 36. Simultaneously, the followers 39 are driven apart, each being forced outwardly on a tube 38 and compressing its respective spring 41 toward the base of the cup member 37. Henceforth any leakage of the lubricant merely lessens the pressure of the lubricant against the inner face of each of the followers 39, and the springs 41 urge the followers inwardly to maintain the lubricant pressure constant over extended periods of time, although the lubricant volume may be undergoing a loss due to heat and leakage.

A salient feature of the invention resides in the utilization of the pin lubricant as a means of pressure to more uniformly and continuously urge a tight seal between the seals 26 and the pin 15. As previously explained each seal 26 has the force of the thrust washer 24 bearing against it toward the center of the pin 15. The lubricant, under pressure of the followers 39, constantly brings forces directed outwardly from the pin center uniformly against the inner sides of the seals 26. Inasmuch as the pressure of the thrust washer 24 bears inwardly against the outer side of a seal 26, and the lubricant under pressure bears outwardly against the inner side of the seal 26, a squeezing action on the seal 26 is effected to more effectively expand the seal inwardly into firm engagement with the surface of the pin 15. This action causes a seal 26 to prevent entry of abrasives between the pin and bushing and at the same time the lubricant resists such entry by being under pressure an amount to exceed that of the foreign materials seeking entry. The seals 26 are urged into a tight sealing engagement with the pin surface brought about by the forces acting against the opposite sides of the seal, and the lubricant is confined by the seals 26 in the area between the working surfaces of the pin and bushing.

Should leakage of lubricant occur around the seals 26 for some reason, the leakage merely lubricates the wear disk 30 and washer 24 to reduce the friction and improve rotation therebetween. Further, any lubricant leaking past the seals 26 is forced against the O-rings 27, when employed, thus effecting a further seal against entry of dirt into the assembly. The positive pressure of the lubricant at the location of the O-rings 27, when leakage is encountered and such rings are employed, has been found effective to resist abrasive material from entering into the recess 22. The leakage of the lubricant under pressure past the seals 26 lubricates the working surface of each seal 26 in its wiping engagement on the pin surface. Foreign matter seeking entry between adjacent surfaces of links 12, 13, the surfaces of the bushing 14 and link 13, and between the relative rotative surfaces of washer 24 and wear disk 30 is entrained with the leaking lubricant and is flushed or carried by the lubricant beyond such elements outside the assembly. Wear on these elements, as well as bushing and pin wear, is effectively reduced through the action performed by the lubricant under pressure.

It is necessary to replenish the lubricant in the reservoir 29 only infrequently, and this can be accomplished on site rather than in a shop. The invention can be utilized to further the useful life of track components which formerly suffered rapid wear once the pin and bushing became worn and the pin-to-pin critical distance was changed. The pin surface is constantly lubricated once the reservoir is filled because of the action of followers 39, and the lubricant is spread from the slots 32 as the bushing inner surface wipes in an arc past the slots when the track is in motion. The seals 26 are forced by the forces against opposite sides thereof into hermetic sealing relationship on the pin surface to better protect against invasion of abrasives into the area between the working surfaces of the pin and bushing.

It is manifest that numerous modifications of the invention may be made in view of the description of the preferred embodiment disclosed hereinbefore without departing from the spirit and scope of the invention. For example, it may be appreciated that the cross-sections of the particular seals and O-rings, as well as their seats, could be modified in practicing the invention, and that the invention is not limited to use with the types of seals and rings disclosed herein.

What is claimed is:

1. A chain link assembly comprising a first set of links, a bushing secured to the first set with ends protruding beyond the links, a second set of links, a pin secured to the second set of links and mounted within the bushing for relative movement therewith, the pin having a reservoir therein with communication to the pin surface, the second set of links having recesses coaxial with the pin into which the ends of the bushing are received freely, a resilient seal in abutting contact with each end of said bushing within the recesses and in frictional engagement with the pin surface, means within each recess for urging the seal into firm contact against the bushing end and the pin surface, means for maintaining a lubricant under pressure in the reservoir for lubricating the pin surface and for applying pressure against each seal toward said recesses of the links whereby each seal is further compressed into sealing engagement with the pin surface, and fitting means for admitting lubricant under pressure into the pin reservoir.

2. A chain link assembly as in claim 1 wherein the means for urging the seal against the bushing end and the pin surface is a thrust washer surrounding the pin and in driven contact with the bushing end, an apertured wear plate surrounding the pin in sliding rotative contact with the thrust washer, and a friction plate surrounding the pin in driven contact with the inner face of the recess of the link and in driving contact with the wear plate whereby relative movement between the bushing and pin causes only the confronting faces of the wear plate and the thrust washer to rotate against one another.

3. A chain link assembly as in claim 1 wherein the means for maintaining a lubricant under pressure is a follower positioned within at least one end of the reservoir to move in a direction to reduce the volume of the reservoir as a lubricant is dispensed therefrom.

4. A chain link assembly as in claim 1 wherein the fitting means includes a valve for admitting lubricant pumped under pressure and a hollow tube on which the follower travels, the tube communicating the reservoir with the valve such that the lubricant pressure causes the follower to travel on the tube into a preloaded position whereupon the removal of a pump from the fitting and subsequent lessening of the pressure of the lubricant is counteracted by the force of the follower on the lubricant within the reservoir.

5. A chain link assembly comprising a first set of links, an elongated bushing secured to the first set of links, the bushing ends extending beyond the links, a second set of links, a hollow pin secured to the second set of links and passed through the bushing, the second set of links having confronting recesses surrounding the pin and receiving the respective ends of the bushings, a resilient seal surroundingly engaged to the pin surface within each recess and in abutting contact with the bushing end within the recess, means positioned within each recess urging the seal inwardly against the bushing end and the pin surface, means for introducing and maintaining a lubricant under pressure within the hollow pin, the pin having passages communicating the pin hollow with the pin surface, the pressure of the lubricant urging the seal outwardly thereby further compressing the seal into sealing contact with the pin surface, a second annular recess in each link of the second set of links, and an O-ring surroundingly engaged on the outer surface of each end of the bushing and outwardly thereof between the first and second sets of links and the O-ring being partially in each of said second annular recesses to form a seal between the adjacent links and bushing.

6. In a chain link assembly having a pivotal connection including a first set of links secured to a bushing, a second set of links secured to a pin with the pin extending through the bushing, at least one link of the second set of links having a recess into which a bushing end is received, a seal of elastic material surrounding the pin with thrust means within said recess urging the seal into firm contact with the bushing end and the pin surface; the sub-assembly comprising a lubricant reservoir formed in the pin adapted to be filled periodically with a lubricant at a predetermined pressure value and being flow-connected to the pin surface for lubricataion of the confronting surfaces of the pin and bushing, and means within the reservoir for maintaining the lubricant pressure at the predetermined value, the lubricant being in contact with the seal at the predetermined pressure value and urging the seal in a direction outwardly toward the recess whereby the seal is further compressed to form a tight seal about the pin surface.

References Cited

UNITED STATES PATENTS

| | | | |
|---|---|---|---|
| 436,008 | 9/1890 | Robinson | 74—257 |
| 1,289,408 | 12/1918 | Davis | 305—14 X |
| 1,567,635 | 12/1925 | Bright | 308—120 |
| 2,403,397 | 7/1946 | Rankin | 308—120 X |
| 3,050,346 | 8/1962 | Simpson | 305—11 |
| 3,110,524 | 11/1963 | Zeller et al. | 305—11 |
| 3,178,239 | 4/1965 | Zeller | 305—11 |
| 3,235,315 | 2/1966 | Schnacke | 305—11 |

BENJAMIN HERSH, *Primary Examiner.*

RICHARD J. JOHNSON, *Examiner.*